ABSTRACT OF THE DISCLOSURE

3' - arylspiro[imidazolidine - 2,1'-phthalan] and 2-[2'-(α - hydroxy-arylmethyl)-aryl]-2-imidazoline derivatives are prepared, inter alia, by the reduction of the corresponding 2-benzoylphenyl-2-(2-imidazolines). The end products are useful as antidepressant agents and an intermediates.

BRIEF SUMMARY OF THE INVENTION

The invention relates to 3'-arylspiro[imidazolidine-2,1'-phthalan] and 2 - [2' - (α'-hydroxy-arylmethyl)-aryl]-2-imidazoline derivatives. More particularly, the invention relates to compounds of the formulae

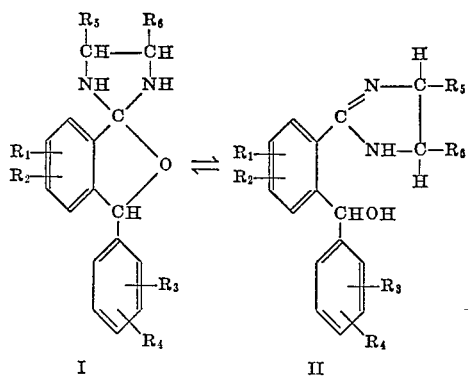

wherein $R_1$, $R_2$, $R_3$ and $R_4$ are each independently selected from the group consisting of hydrogen, halogen, lower alkyl, lower alkoxy, hydroxy and trifluoromethyl; $R_5$ and $R_6$ are each independently selected from the group consisting of hydrogen and lower alkyl, and pharmaceutically acceptable acid addition salts thereof. The compounds of Formulae I and II are useful as antidepressant agents.

In another aspect, the invention relates to compounds wherein $R_1$, $R_2$, $R_5$ and $R_6$ are hydrogen or to compounds wherein $R_1$, $R_2$ and $R_3$ are hydrogen.

In another aspect, the invention relates to a process exemplified by the following reaction scheme:

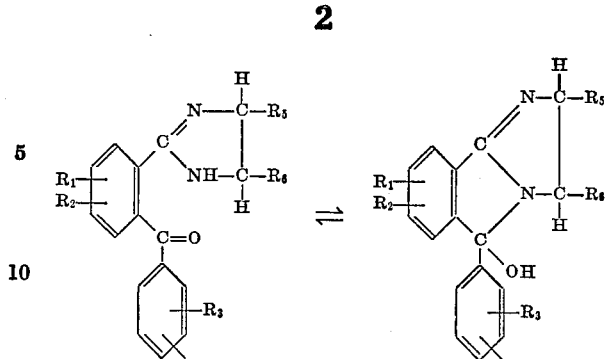

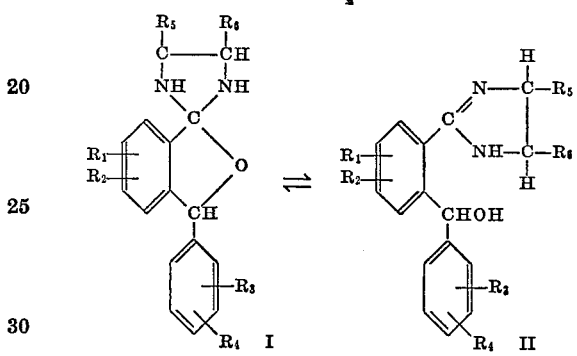

wherein $R_1$, $R_2$, $R_3$, $R_4$, $R_5$ and $R_5$ are as previously described.

In a still further aspect, the invention relates to a process exemplified by the following reaction scheme:

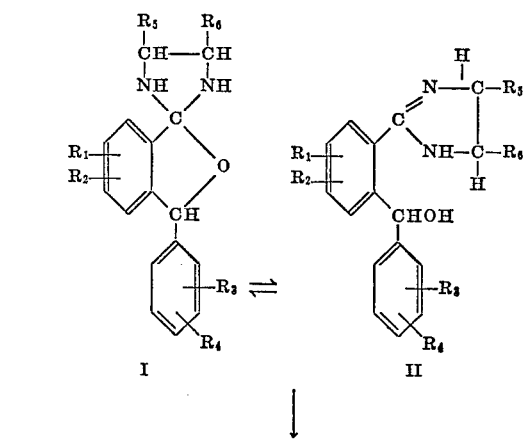

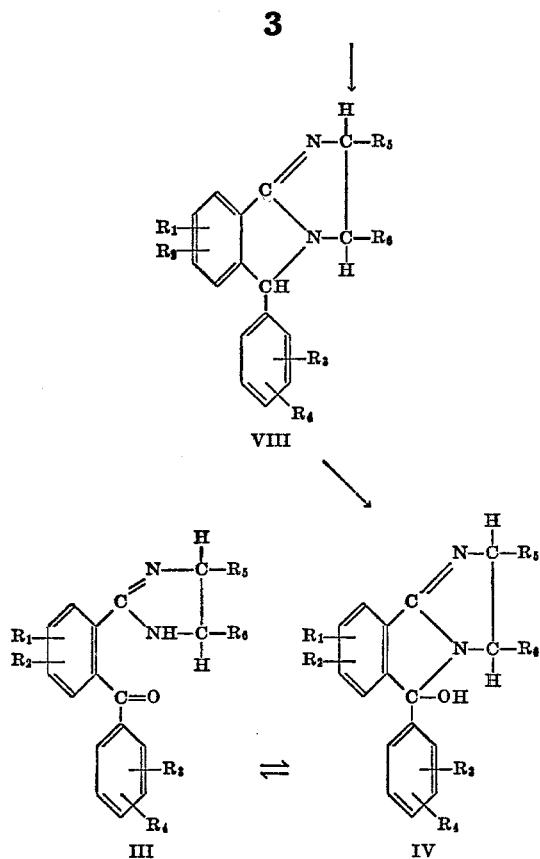

wherein $R_1$, $R_2$, $R_3$, $R_4$, $R_5$ and $R_6$ are as previously described.

DETAILED DESCRIPTION OF THE INVENTION

In its product aspect, the invention relates to compounds of the formula

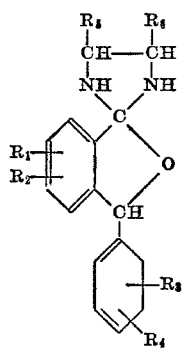

wherein $R_1$, $R_2$, $R_3$ and $R_4$ are each independently selected from the group consisting of hydrogen, halogen, lower alkyl, lower alkoxy, hydroxy and trifluoromethyl; and $R_5$ and $R_6$ are each independently selected from the group consisting of hydrogen and lower alkyl, which can undergo a prototropic shift to form compounds of the formula

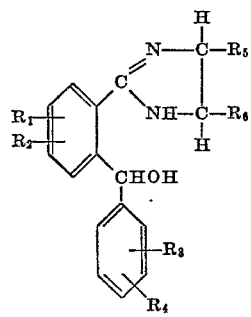

wherein $R_1$, $R_2$, $R_3$, $R_4$, $R_5$ and $R_6$ each have the same meaning as hereinabove, and pharmaceutically acceptable acid addition salts thereof. Both tautomeric isomers as well as mixtures thereof are within the scope of the invention.

The process aspects of the invention are exemplified by the following reaction schemes, which also include a schematic representation of the tautomeric mixtures mentioned above.

REACTION SCHEME A

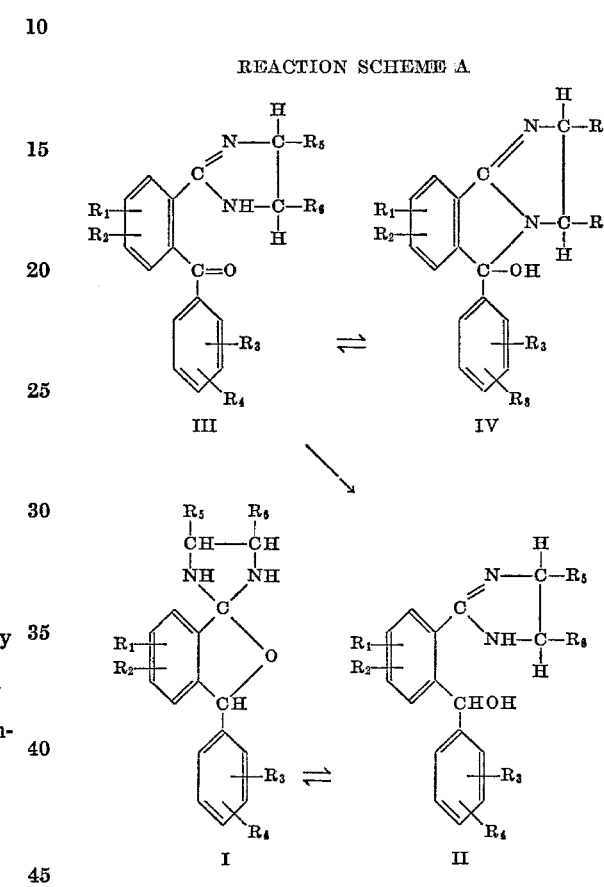

wherein $R_1$, $R_2$, $R_3$, $R_4$, $R_5$ and $R_6$ are as previously described.

The compounds of Formula III can also undergo a prototropic shift to form compounds of Formula IV.

In Reaction Scheme A, the compounds of Formula III are converted to the compounds of Formula I and its tautomers utilizing a reducing agent such as, sodium borohydride, hydrogen, in the presence of Raney nickel, zinc in ethanol and the like. The reduction is suitably carried out at room temperature or above, preferably at a temperature between about 20° C. and 100° C. Moreover, the reduction can be suitably carried out in the presence of an inert organic solvent such as, for example, dimethylformamide; hydrocarbon solvents such as benzene, toluene; alkanols such as, methanol, ethanol and the like.

As noted above, the hydroxyl proton of a compound of Formula II can undergo a prototropic shift to form the corresponding isomeric end product of Formula I. In solution, the product obtained upon reduction of a compound of Formula III will ordinarily be a mixture of the tautomeric forms I and II. The relative amounts of the isomeric forms present is dependent upon such factors as the solvent system employed, the pH of the medium and the particular product, i.e., the meaning of $R_1$, $R_2$, $R_3$, $R_4$, $R_5$ and $R_6$ in Formulae I and II.

The intermediates of Formula VI are readily condensed with diamines of the formula

                                    VII wherein $R_5$ and $R_6$ have the same meaning as hereinabove by mixing the components or by reacting them in the presence of an organic solvent such as benzene, toluene; alcohols such as lower alkanols and the like. The condensation is conveniently carried out at room temperature or above, preferably at a temperature between about 20° C. and 150° C. Alternatively, the diamine reactant of Formula VIII can be employed as a salt thereof in which case the reaction is conducted by heating the mixture of reactants to a melt.

The reaction products, i.e., the compounds of Formula VIII can be readily oxidized, for example, by treatment with an oxidizing agent such as hydrogen peroxide or by exposure to gaseous oxygen at room temperature to give the peroxides of Formula IX which are readily reduced to the corresponding end products. The oxidation is conveniently carried out in an organic solvent such as alcohols, dimethylformamide, etc. at room temperature. Higher or lower temperatures, e.g., between about 20° C. and 100° C., can also be employed.

Since the peroxide intermediates readily undergo reduction, the reaction mixture obtained upon treatment of a compound of Formula VIII with an oxidizing agent will ordinarily contain the end products along with the peroxide intermediate of Formula IX. Complete reduction of the peroxide can be accomplished without separating it from the reaction mixture and, in a preferred embodiment, the oxidation product is submitted directly to treatment with a reducing agent. If desired, however, the peroxide intermediate of Formula IX can be separated from the reaction mixture obtained upon treatment of a compound of Formula VIII with an oxidizing agent by any of the usual techniques, e.g., chromatographic separation, fractional crystallization, etc.

The reduction of the peroxide is conveniently carried out by employing any reducing agent conventionally used for the reduction of peroxides such as sodium sulfite, trialkylphosphite, etc., preferably in the presence of an organic solvent such as an alcohol, e.g., methanol, ethanol, etc.; dimethylformamide and the like, or when using a salt of the peroxide, the reduction can be carried out in an aqueous solvent, e.g., in an aqueous alcoholic solvent. The reduction is suitably carried out at room temperature or above, preferably at a temperature between about 20° C. and 100° C.

As noted above, the hydroxyl proton of a compound of Formula IV can undergo a prototropic shift to form the corresponding isomeric end product of Formula III. In solution, the product obtained upon oxidation and reduction of an intermediate of Formula VIII will ordinarily be a mixture of the tautomeric forms III and IV. The relative amounts of the isomeric forms present is dependent upon such factors as the solvent system employed, the pH of the medium and the particular product, i.e., the meaning of $R_1$, $R_2$, $R_3$, $R_4$, $R_5$ and $R_6$ in Formulae III and IV. For example, in a solution of chloroform, the product obtained upon oxidation and reduction of 2,3-dihydro-5-phenyl-5H-imidazo[2,1-a]isoindole contains a mixture of the tautomers 2,3-dihydro-5-hydroxy-5-phenyl-5H-imidazo[2,1-a]isoindole and 2-(2-benzoylphenyl)-2-imidazoline, in a ratio of about 1:1. The acid addition salts isolated in the ordinary manner from the reaction product of the oxidation and reduction of 2,3-dihydro-5-phenyl-5H-imidazo[2,1-a]isoindole are ordinarily obtained as structure III.

REACTION SCHEME D

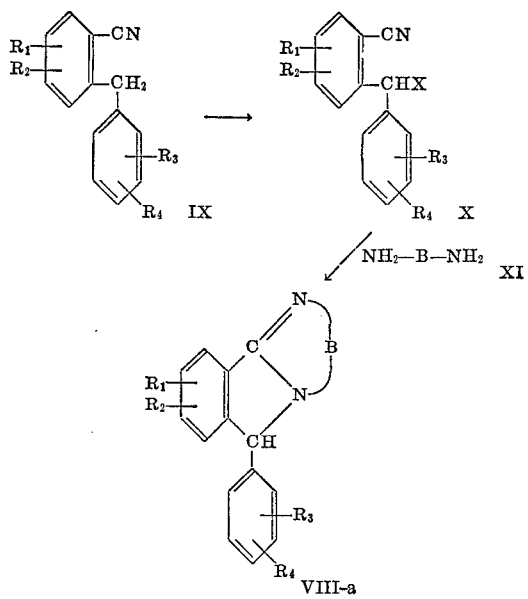

wherein $R_1$, $R_2$, $R_3$ and $R_4$ are as previously described; B is an alkylene chain of 2 to 4 carbon atoms in which one or more of the hydrogens can be replaced by lower alkyl, preferably B is

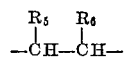

wherein $R_5$ and $R_6$ are each independently hydrogen or lower alkyl, and X is a halogen such as chlorine, bromine or iodine.

In Reaction Scheme D, the compounds of Formula IX can be converted to the compounds of Formula X, utilizing a halogenating agent, for example, halogen, such as chlorine, bromine or iodine, N-bromosuccinimide, N-chlorosuccinimide and the like.

The compounds of Formula X can readily be condensed with diamines of the formula $$NH_2-B-NH_2 \qquad XI$$

wherein B is as previously described, by mixing the components or by reacting them in the presence of an inert organic solvent, for example, ethers, hydrocarbons, such as benzene, toluene; alcohols, such as lower alkanols and the like. The condensation is conveniently carried out at room temperature or above, preferably at a temperature between about 20° C. and 150° C.

Alternatively, the diamine reactant of Formula XI can be employed as a salt thereof in which case the reaction is conducted by heating the mixture of reactants to a melt. The compounds of Formula IX are known compounds or can be prepared in an analogous manner to known compounds.

Suitable salts of the compounds of Formulae I and III and their tautomers, are prepared from non-toxic organic and inorganic acids. Suitable organic acids are, for example, maleic acid, fumaric acid, ascorbic acid, tartaric acid, salicyclic acid, succinic acid, citric acid and the like. Suitable inorganic acids are, for example, the hydrohalic acids, e.g., hydrochloric acid and hydrobromic acid; sulfuric acid, sulfamic acid, phosphoric acid, etc. The acid addition salts are readily prepared by the usual techniques for the preparation of acid addition salts which are readily apparent to those skilled in the art.

The compounds of Formula I and their tautomers are useful intermediates for the preparation of compounds of Formula III and their tautomers. The compounds of Formula I, their tautomers and their pharmaceutically acceptable acid addition salts are also useful as psychostimulants. By way of illustration, when administered, for

REACTION SCHEME B

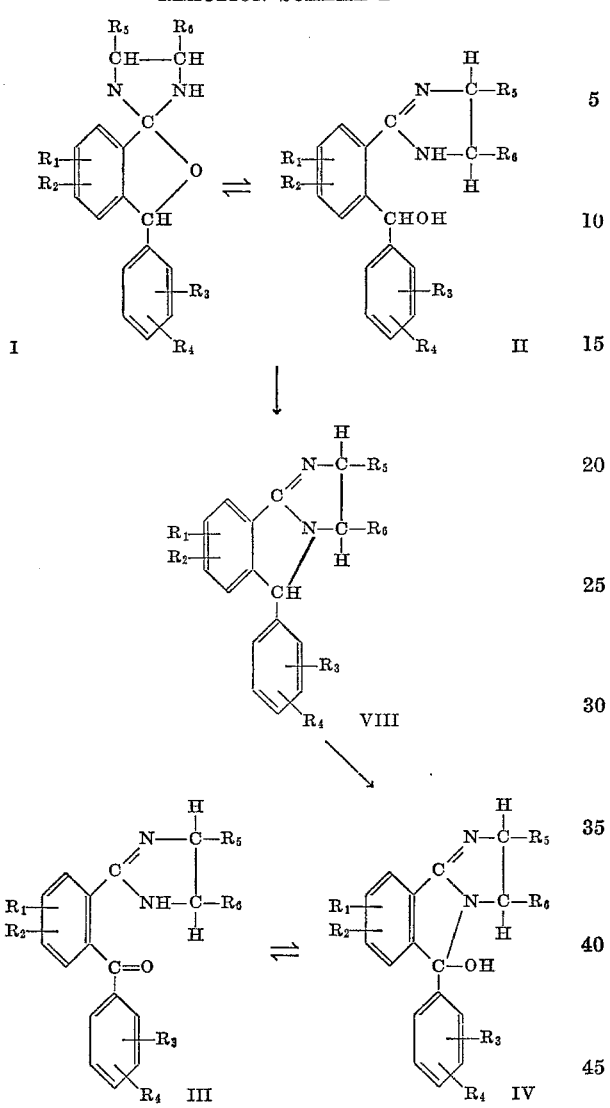

The compounds of Formulae III and IV are prepared according to the following reaction scheme:

REACTION SCHEME C

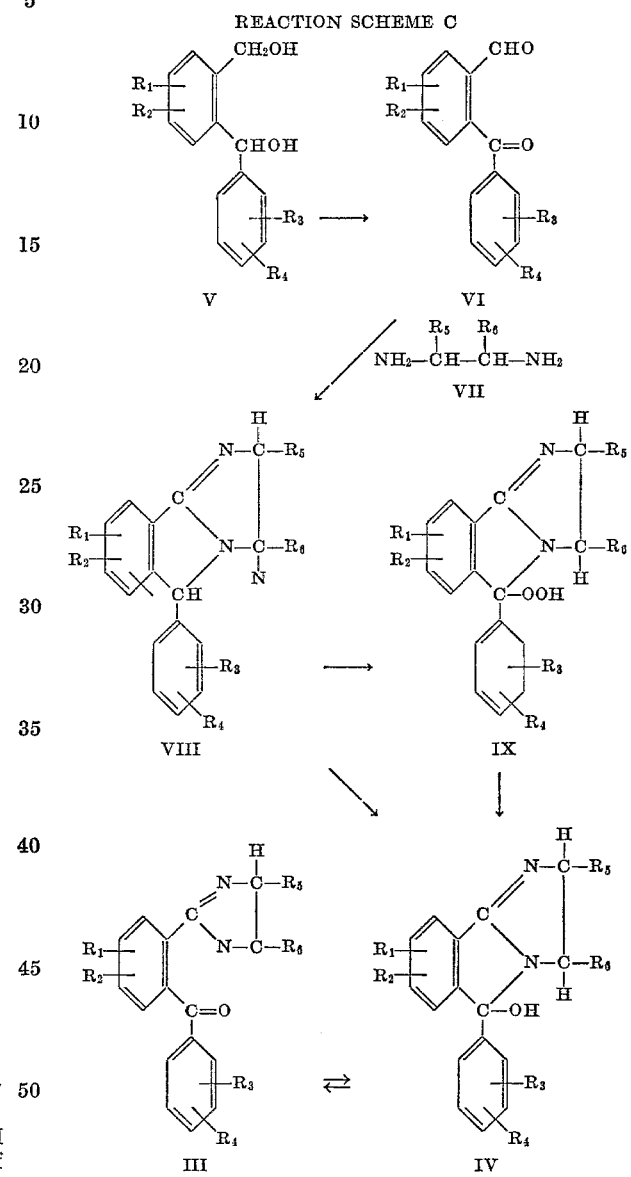

wherein $R_1$, $R_2$, $R_3$, $R_4$, $R_5$ and $R_6$ are as previously described.

In Reaction Scheme B, the compounds of Formula I and its tautomers can be converted to the compounds of the Formula VIII utilizing as a catalyst a strong base or acid, such as boron trifluoride, sodium hydride, alkali metal alkoxides, preferably lower alkoxides and the like. The rearrangement is suitably carried out at room temperature or above, preferably at a temperature between about 20° C. and 100° C. Moreover, the rearrangement can be suitably carried out in the presence of an inert organic solvent, such as, for example, dimethylformamide, dimethylsulfoxide; hydrocarbon solvents, such as benzene and toluene; chlorinated hydrocarbons, such as chloroform; and alkanols, such as methanol, ethanol and the like.

The compounds of Formula VIII can be converted to the compounds of Formula IV and its tautomers utilizing an oxidizing agent, such as hydrogen peroxide or by exposure to gaseous oxygen at room temperature. The oxidation is conveniently carried out in an inert organic solvent, for example, alcohols, ethers, dimethylformamide, chlorinated hydrocarbons, hydrocarbons, and the like, at room temperature. Higher or lower temperatures, e.g., between about 20° C. and 100° C. can also be employed.

wherein $R_1$, $R_2$, $R_3$, $R_4$, $R_5$ and $R_6$ are as previously described.

In Reaction Scheme C, the diol starting materials of Formula V are known compounds or are readily obtainable in analogy to the preparation of the known compounds. The diol starting materials can be readily converted to the dicarbonyl intermediates of Formula VI by oxidation techniques which are known per se such as, for example, using selenium dioxide and the like, as the oxidizing agent or by employing other oxidizing systems such as chromium trioxide in pyridine.

Treatment with an oxidizing agent can be conveniently carried out in an organic solvent such as, for example, dimethylformamide, dimethylsulfoxide; hydrocarbon solvents such as benzene, toluene; alkanols, e.g., the lower alkanols, methanol, ethanol, etc.; acetic acid and the like. The oxidation reaction is preferably carried out at an elevated temperature suitably at a temperature between about room temperature and about 150° C.

example, orally to warm-blooded animals, such as mice, 2-[2-(α-hydroxybenzyl)-phenyl]-2-imidazoline prevented the ptosis induced by tetrabenazine at 7 mg./kg. (Pletscher et al., Progress. Drug Research, vol. II, page 417, 1960).

The compounds of Formula III their tautomers and their pharmaceutically acceptable acid addition salts are useful as psychostimulants. When administered for example orally to animals such as mice, they produce a direct-acting stimulant effect of long duration in single doses in amounts ranging from .03 mg./kg. to 50 mg./kg. By way of illustration the compound 2-(2-benzoylphenyl)-2-imidazoline, which has demonstrated an $LD_{50}$ in mice of, for example 200 mg./kg. p.o.; 130 mg./kg. s.c.; 77 mg./kg. i.p.; and 37 mg./kg. i.v. (Proc. Soc. Exptl. Biol. Med., vol. 57, page 261); reversed the hypothermia induced by reserpine in mice at a dose of 10 mg./kg. s.c. Med. Pharmacol Exp., vol. 12, pages 226–232, 1965); prevented by ptosis induced by tetrabenazine in mice at .06 mg./kg. p.o. (Pletscher et al., Progress. Drug Research, vol. II, page 417, 1960); reversed the reserpine (10 mg./kg. s.c.) induced sedation in mice by increasing their locomotor activity at doses of 25–50 mg./kg. p.o. (Med. Pharmacol. Exp., vol. 12, pages 226–232, 1965); and potentiated the effects of $\beta$-(3,4-dihydroxyphenyl)-$\alpha$-alanine (DOPA) in mice at a dose of 6.25 mg./kg. i.p. (Arc. Exp. Path. and Pharm., vol. 140, page 237). The compounds of Formulae III and IV have psychostimulant effects qualitatively similar in many respects to those of imipramine and amphetamine which are well known for their therapeutic uses and properties. Among other illustrative compounds of Formula III or their tautomers which have been similarly tested and found to be qualitatively similar to 2-(2-benzoylphenyl)-2-imidazoline, there can be named by way of exemplification the following:

5-(4-chlorophenyl)-2,3-dihydro-5-hydroxy-5H-imidazo [2,1-a]isoindole; and
2,3-dihydro-5-hydroxy-5-(4-methoxyphenyl)-5H-imidazo[2,1-a]isoindole.

The activity of the compounds of Formula IV first demonstrated by pharmacological evaluation in warm-blooded animals as indicated herein permits their use in therapy in the same general manner as imipramine or amphetamine, which latter compounds exhibit psychostimulant activity in the DOPA potentiation test at doses of 10 mg./kg. i.p. and 1.0 mg./kg. i.p., respectively, and in the ptosis prevention test at doses of >60 mg./kg. and 7.5 mg./kg., respectively. As a further illustration of the psychostimulant activity of the compounds of Formula III, the compound 2,3,4,5-tetrahydro-7-hydroxy-7-phenyl-7H-diazepino[2,1-a]isoindole, which has demonstrated an $LD_{50}$ of, for example, 40 mg./kg. i.v., prevented the ptosis induced by tetrabenazine at 0.4 mg./kg. p.o.; reversed the hypothermia and hypometabolic effects induced by reserpine (10 mg./kg. s.c.) in mice at 25 mg./kg. p.o.; and potentiated the effects of DOPA in mice at a dose of 7.5 mg./kg. i.p. The compounds of Formula III and IV thus demonstrate a pattern of activity associated with antidepressants of known clinical efficacy and are similarly useful as psychostimulants in the treatment of depressed states, for example, in cases of simple depression or in cases of chronic nervous exhaustion. The compounds of Formula III and their tautomers are disclosed in copending application Ser. No. 639,315, filed May 18, 1967.

The novel end products of this invention, i.e., the compounds of Formula I and their tautomers, as well as the compounds of Formula III and their tautomers, are mostly white crystalline odorless solids melting at temperatures in the order of 50°–250° C. They have basic properties and can be conveniently prepared in the form of their acid addition salts. Suitable salts are prepared as described hereinabove. The salts are characteristically white crystalline odorless solids.

The compounds of Formula I, as well as the compounds of Formula III, preferably in the form of their acid addition salts, can be formulated into preparations suitable for administration by enteral or parenteral routes. They can be embodied in pharmaceutical unit dosage containing from about 0.5 mg. to about 100 mg. of active material, i.e., a compound of Formulae I or III or a salt thereof. Parenteral formulations will ordinarily contain less of the active substance than compositions intended for enteral, e.g., oral administration. For oral administration, the products of this invention can be prepared as tablets, capsules and the like containing about 10 to 50 mg. of active material. Formulations suitable for oral administration may be such as to provide either immediate, or in the alternative, sustained release of the active drug. In general, the formulations will be prepared with pharmaceutically acceptable adjuvant materials comprising from about 60 to about 98 percent of the weight of the compositions in oral dosage form.

For parenteral administration, the compounds can be formulated with a liquid diluent, for example, distilled water, in the preparation of a suitable parenteral dosage form. The preferred parenteral dosage form will contain from about .5 mg. to about 15 mg. of the active drug. In general, the compounds of this invention are formulated with conventional inert adjuvants into dosage forms suitable for enteral or parenteral administration following the conventional techniques and procedures of the prior art. Suitable dosage forms include tablets and capsules as well as solutions, emulsions and suspensions, The inert adjuvants which are suitable for use in preparing the various dosage forms include liquids and solids, inorganic or organic in nature, such as water, gelatin, lactose, starch, magnesium stearate, talc, vegetable oils, gums, polyalkylene glycols, Vaseline, etc. Additionally, the compounds can be used in combination with preservatives, stabilizers, wetting or emulsifying agents salts for altering the osmotic pressure, buffers, etc. If desired, the compound can be used also in admixture with other therapeutically valuable substances. Specific embodiments showing illustrative formulations of an exemplary compound of Formula III follow.

Tablet formulation

| | Per tablet, mg. |
|---|---|
| 2-(2-benzoylphenyl)-2-imidazoline | 10.0 |
| Lactose | 113.5 |
| Corn starch | 70.5 |
| Pregelatinized corn starch | 8.0 |
| Calcium stearate | 3.0 |
| Total weight | 205.0 |

Procedure (1) 2-(2-benzoylphenyl)-2-imidazoline was mixed with the lactose, corn starch, and pregelatinized corn starch in a suitable size mixer.

(2) The mix was passed through a Fitzpatrick Comminuting Machine fitted with a No. 1A screen and with knives forward.

(3) The mix was returned to the mixer and moistened with water to a thick paste. The moist mass was passed through a No. 12 screen and the moist granules were dried on paper-lined trays at 100° F.

(4) The dried granules were returned to the mixer, the calcium stearate was added and mixed well.

(5) The granules were compressed at a tablet weight of 200 mg., using standard concave punches having a diameter of 5/16 inch.

Suppository formulation

| | Per 1.3 gram suppository, gram |
|---|---|
| 2-(2-benzoylphenyl)-2-imidazoline | 0.025 |
| Wecobee M (E. F. Drew Company, 522 Fifth Ave., New York, N.Y.) | 1.230 |
| Carnauba wax | 0.045 |

Procedure (1) The Wecobee M and the Carnauba wax were melted in a suitable size glass-lined container (stainless steel may also be used), mixed well and cooled to 45° C.

(2) 2-(2-benzoylphenyl) - 2 - imidazoline, which had been reduced to a fine powder with no lumps, was added and stirred until completely and uniformly dispersed.

(3) The mixture was poured into suppository molds to yield suppositories having an individual weight of 1.3 grams.

(4) The suppositories were cooled and removed from molds. They were individually wrapped in wax paper for packaging. (Foil may also be used.)

Capsule formation

|  | Per capsule, mg. |
| --- | --- |
| 2-(2-benzoylphenyl)-2-imidazoline | 25 |
| Lactose | 158 |
| Corn starch | 37 |
| Talc | 5 |
| Total weight | 255 |

Procedure (1) 2-(2-benzoylphenyl) - 2 - imidazoline was mixed with the lactose and corn starch in a suitable mixer.

(2) The mixture was further blended by passing through a Fitzpatrick Comminuting Machine with a No. 1A screen with knives forward.

(3) The blended powder was returned to the mixer, the talc added and blended thoroughly. The mixture was then filled into No. 4 hard shell gelatin capsules on a Parke Davis capsulating Machine (any similar type machine may be used).

Tablet formulation

|  | Per tablet, mg. |
| --- | --- |
| 3'-phenylspiro[imidazolidine-2,1'-phthalan] | 25.00 |
| Dicalcium phosphate dihydrate, unmilled | 175.00 |
| Corn starch | 24.00 |
| Magnesium stearate | 1.00 |
| Total weight | 225.00 |

Procedure (1) 3' - phenylspiro[imidazolidine-2,1'-phthalan] and corn starch were mixed together and passed through a No. 00 screen in Model "J" Fitzmill with hammers forward.

(2) This premix was then mixed with dicalcium phosphate and one-half of the magnesium stearate, passed through a No. 1A screen in Model "J" Fitzmill with knives forward, and slugged.

(3) The slugs were passed through a No. 2A plate in Model "D" Fitzmill at slow speed with knives forward, and the remaining magnesium stearate was added.

(4) The mixture was mixed and compressed.

Suppository formulation

|  | Per 1.3 gm., suppository, gm. |
| --- | --- |
| 3'-phenylspiro[imidazolidine-2,1'-phthalan] | 0.010 |
| Wecobee M (E. F. Drew Company 522 Fifth Ave. New York, N.Y.) | 1.245 |
| Carnauba wax | 0.045 |

Procedure (1) The Wecobee M and the Carnauba wax were melted in a suitable size glass-lined container (stainless steel may also be used), mixed well and cooled to 45° C.

(2) The 3'-phenylspiro[imidazolidine-2,1'-phthalan] which had been reduced to a fine powder with no lumps, was added and stirred until completely and uniformly dispersed.

(3) The mixture was poured into suppository molds to yield suppositories having an individual weight of 1.3 grams.

(4) The suppositories were cooled and removed from molds. They were then individually wrapped in wax paper for packaging (foil may also be used).

Capsule formulation

|  | Per capsule, mg. |
| --- | --- |
| 3'-phenylspiro[imidazolidine-2,1'-phthalan] | 10 |
| Lactose, U.S.P. | 165 |
| Corn starch, U.S.P. | 30 |
| Talc, U.S.P. | 5 |
| Total weight | 210 |

Procedure (1) 3'-phenyl-spiro[imidazolidine-2,1'-phthalan], lactose and corn starch were mixed in a suitable mixer.

(2) The mixture was further blended by passing through a Fitzpatrick Comminuting Machine with a No. 1A screen with knives forward.

(3) The blended powder was returned to the mixer, the talc added and blended thoroughly.

(4) The mixture was filled into No. 4 hard shell gelatin capsules on a Parke Davis Capsulating Machine. (Any similar type capsulating machine may be used.)

The drug in the preferred oral dosage form, i.e., tablets or capsules containing 10 to 25 mg. of active material, will be administered under ordinary circumstances three or four times daily. The parenteral composition will be administered ordinarily one or two times daily. Effective dosages for the administration of compounds of this invention, i.e., the compounds of Formulae I and II, as well as compounds of Formulae III and IV will, of course, depend in all instances upon the severity and individual characteristics of each case as determined by the prescribing practitioner. It will be understood that dosage forms containing larger and smaller quantities of the active drug ingredient are encompassed by the scope of this invention and that such dosage forms can be administered more or less frequently than indicated heretofore. It will be understood that dosage forms containing inert adjuvants in quantities which are greater or less than those indicated heretofore are also encompassed by this invention.

The invention will be more fully understood from the examples which follow. These examples are illustrative of the invention and are not to be construed as ilimitative thereof. All temperatures are in degrees centigrade. Decomposition melting points were taken in a Mettler FP–1 apparatus in open capillaries. They may vary ±10° depending on the rate of heating.

EXAMPLE 1

Preparation of 2-benzoylbenzaldehyde

A mixture of 1 g. of selenium dioxide and 1 g. of 2-hydroxymethylbenzhydrol in 5 ml. of acetic acid was refluxed for 4½ hours. The solution was cooled, filtered from selenium and the filtrate was poured into ice water and made alkaline with sodium hydroxide. Extraction with ether gave a yellow oil to which petroleum ether was added. White prisms were obtained which melted at 64–67°. Ultraviolet maximum (2-propanol) at 226/7 m$\mu$ ($\epsilon$=15,750) and 251/2 m$\mu$ ($\epsilon$=18,500), inflexion at 294 m$\mu$ ($\epsilon$=2600); infrared absorption (CHCl$_3$) at 1665 cm.$^{-1}$ and 1705 cm.$^{-1}$.

*Analysis.*—Calcd. for C$_{14}$H$_{10}$O$_2$ (percent): C, 79.98; H, 4.79. Found (percent): C, 80.00; H, 4.68.

EXAMPLE 2

Preparation of 2-(p-chlorobenzoyl)-benzaldehyde

A solution of 18.6 g. of 4'-chloro-2-hydroxymethylbenzhydrol in 100 ml. of acetic acid and 10.4 g. selenium dioxide was refluxed for 2 hours. The mixture was poured on ice and made alkaline and extracted with ether. Concentration of the ether solution and addition of petroleum ether gave pale yellow prisms which after recrystallization from a mixture of ether and petroleum ether gave 2-(p-chlorobenzoyl)-benzaldehyde melting at 112–113°. Ultraviolet inflexion (2-propanol) at 225 mµ (ε=17,500) and maximum at 259 mµ (ε=22,500), infrared absorption (CHCl₃) at 1670 cm.⁻¹ and 1705 cm.⁻¹.

*Analysis.*—Calcd. for $C_{14}H_9ClO_2$ (percent): C, 68.72; H, 3.71. Found (percent): C, 69.12; H, 3.50.

EXAMPLE 3

Preparation of 2-(p-anisoyl)-benzaldehyde

A solution of 26 g. of 4'-methoxy-2-hydroxymethylbenzhydrol in 140 ml. of acetic acid and 14.5 g. selenium dioxide was refluxed for 2 hours. The mixture was filtered and the filtrate was made basic. An oil separated which crystallized on standing and was collected. Recrystallization from a mixture of methylene chloride and petroleum ether gave off-white platelets melting at 90–91°. Ultraviolet maxima (2-propanol) at 221 mµ (ε=21,600), 258 mµ (ε=12,400) and 292 mµ (ε=17,000); infrared absorption (CHCl₃) at 1660 cm.⁻¹ and at 1700 cm.⁻¹.

*Analysis.*—Calcd. for $C_{15}H_{12}O_3$ (percent): C, 74.99; H, 5.03. Found (percent): C, 75.27; H, 5.26.

EXAMPLE 4

Preparation of 2-benzoyl-4-chlorobenzaldehyde

A solution of 9.3 g. of 5-chloro-2-hydroxymethylbenzhydrol in 50 ml. of acetic acid and 5.2 g. of selenium dioxide was refluxed for 3 hours. The mixture was filtered, cooled, poured on ice, made alkaline and extracted with ether. Concentration and addition of petroleum ether gave the product as prisms which after recrystallization from a mixture of ether and petroleum ether melted at 82–84°. Ultraviolet maxima (2-propanol) at 230 mµ (ε=19,500) and 257 mµ (ε=23,500); infrared absorption (CHCl₃) at 1675 cm.⁻¹ and 1705 cm.⁻¹.

*Analysis.*—Calcd. for $C_{14}H_9ClO_2$ (percent): C, 68.72; H, 3.71. Found (percent): C, 69.05; H, 3.87.

EXAMPLE 5

Preparation of 2-(4-bromobenzoyl)-benzaldehyde

To a stirred solution of 8.2 g. of lithium aluminum hydride in 180 ml. of tetrahydrofuran was added 40 g. of 2-(4-bromobenzoyl)-benzoic acid in the course of 30 minutes. The mixture, after being kept at 25° for 2 hours, was cooled and 40 ml. of a saturated sodium sulfate solution was added slowly. The mixture was filtered and the filtrate concentrated. The resulting oily residue was dissolved in 32 ml. of acetic acid and 96 ml. of xylene. This solution was added to a mixture of 17.1 g. of selenium dioxide in 60 ml. of acetic acid and 120 ml. of xylene and refluxed for 17 hours. During this time about 22 ml. of an aqueous phase had collected in a Dean Stark receiver. The solution was filtered, washed with sodium hydroxide and concentrated. Addition of petroleum ether gave white prisms melting at 103–109°. Recrystallization from a mixture of ether and petroleum ether raised the melting point to 110–113°. Ultraviolet inflexion (2-propanol) at 225 mµ (ε=17,500) and maximum at 261 mµ (ε=22,200); infrared absorption (CHCl₃) at 1675 cm.⁻¹ and 1705 cm.⁻¹.

*Analysis.*—Calcd. for $C_{14}H_9BrO_2$ (percent): C, 58.16; H, 3.14. Found (percent): C, 57.86; H, 3.41.

EXAMPLE 6

Preparation of 2,3-dihydro-5-phenyl-5H-imidazo[2,1-a]isoindole sulfate from 2-benzoylbenzaldehyde A solution of 21 g. of o-benzoylbenzaldehyde in 250 ml. of toluene and 34 ml. of ethylenediamine was refluxed for 24 hours. During this time 11.5 ml. of an aqueous phase was separated in a Dean Stark receiver. The reaction mixture was concentrated in vacuo to an orange oil which was dissolved in ethyl acetate and washed twice with water. The solution was dried and concentrated, dissolved in 200 ml. of ethyl acetate and a solution of 5.3 ml. of concentrated sulfuric acid in 100 ml. of ethanol was added. A crystalline precipitate was collected which after recrystallization from a mixture of methanol and ethyl acetate gave white prisms melting at 226–229° dec. Ultraviolet maxima (2-propanol) at 240 mµ (ε=15,000) and 276 mµ (ε=5,400); infrared absorption (KBr) 1660 cm.⁻¹.

*Analysis.*—Calcd. for $C_{16}H_{14}N_2 \cdot H_2SO$ (percent): C, 57.82; H, 4.85; N, 8.43. Found (percent): C, 57.61; H, 4.81; N, 8.73.

The hydrochloride of 2,3-dihydro-5-phenyl-5H-imidazo[2,1-a]isoindole was prepared from the corresponding base with aqueous 1 N hydrochloric acid. On recrystallization from a mixture of methanol and toluene, white prisms melting at 226–228° dec. were obtained. Nmr peaks (DMSO) at δ 3.6–4.6 (4H, multiplet), at δ 6.13 (1H, singlet), at δ 7.3–7.9 (9H, multiplet).

EXAMPLE 7

Preparation of 2,3-dihydro-5-hydroperoxy-5-phenyl-5H-imidazo[2,1-a]isoindole The base liberated from 16.6 g. of 2,3-dihydro-5-phenyl-5H-imidazo[2,1-a]isoindole sulfate was dissolved in 50 ml. of ethanol and 11 ml. of a 30 percent by weight aqueous solution of hydrogen peroxide was added. The mixture was stirred at 25° for 40 hours. A crystalline crop was collected and placed on a column containing 250 g. of silica gel. Elution with a mixture of 1 part of methanol (volume) and 1 part of chloroform (volume) gave fractions from which on concentration a crystalline residue was obtained. Recrystallization from a mixture of methanol and chloroform gave the produce as white prisms melting at 167–168° dec. Ultraviolet inflexions (2-propanol) at 232 mµ (ε=14,000) and 290 mµ (ε=2600), maxima at 269 mµ (ε=4000) and 275 mµ (ε=4400), infrared absorption (KBr) at 1665 cm.⁻¹.

*Analysis.*—Calcd. for $C_{16}H_{14}N_2O_2$ (percent): C, 72.16; H, 5.30; N, 10.52. Found (percent): C, 72.09; H, 5.39; N, 10.22.

The hydrochloride of 2,3-dihydro-5-hydroperoxy-5-phenyl-5H-imidazo[2,1-a]isoindole was prepared with methanolic hydrogen chloride and after recrystallization from a mixture of methanol and ether gave white platelets melting at 158–159° dec. (Ultraviolet maxima (2-propanol) at 245 mµ (ε=14,800) and 278 mµ (ε=5200); infrared absorption (KBr) at 1680 cm.⁻¹.

*Analysis.*—Calcd. for $C_{16}H_{14}N_2O_2 \cdot HCl$ (percent): C, 63.47; H, 4.99; Cl, 11.71. Found (percent): C, 63.63; H, 4.83; Cl, 11.79.

EXAMPLE 8

Preparation of 5-(p-chlorophenyl)-2,3-dihydro-5-hydroperoxy-5H-imidazo[2,1-a]isoindole hydrochloride 1 gram of 2-(p-chlorobenzoyl)-benzaldehyde was thoroughly mixed with 0.9 g. of ethylenediamine toluene sulfonate and heated in a metal bath (bath temperature, 120–125°) for 1 minute. On cooling a deep yellow glassy material was obtained which one addition of methylene chloride, ethyl acetate and petroleum ether gave a crystalline precipitate which was treated with ice cold aqueous sodium hydroxide. The mixture was extracted with ether and the extract was exposed to air at 25° for 18 hours. A crystalline crop was collected and suspended in methylene chloride. Addition of etheral hydrogen chloride gave a crystalline material which after recrystallization from a mixture of methanol and ether gave white prisms melting at 175–177° dec. Ultraviolet inflexion (2-propanol) at 224 mµ (ε=21,800) and 279 mµ (ε=5,600), maximum at 243 mµ (ε=15,500); infrared absorption (KBr) at 1,670 cm.⁻¹.

*Analysis.*—Calcd. for $C_{16}H_{13}ClN_2O_2 \cdot HCl$ (percent): C, 56.99; H, 4.18; Cl, 21.03; N, 8.31. Found (percent): C, 57.14; H, 4.15; Cl, 21.02; N, 8.30.

EXAMPLE 9

Preparation of 2-(2-benzoylphenyl)-2-imidazoline from 2,3-dihydro-5-phenyl-5H-imidazo[2,1-a]isoindole To a suspension of 8.5 g. of 2,3-dihydro-5-phenyl-5H-imidizo[2,1-a]isoindole sulfate in water was added 50 ml. of 1 N aqueous sodium hydroxide. Extraction with methylene chloride and concentration gave an orange oil which was dissolved in a mixture of 30 ml. of methylene chloride and 30 ml. of ethanol. To this solution was added 2.3 ml. of 30 percent by weight hydrogen peroxide. After stirring at 25° for 18 hours, a precipitate was collected which after recrystallization from methanol gave white prisms melting at 194–196° dec. Ultraviolet inflexions (2-propanol) at 225 mμ ($\epsilon$=15,500) and 290 mμ ($\epsilon$=2,250), maxima at 269 mμ ($\epsilon$=4,100) and 276 mμ ($\epsilon$=4,250); infrared absorption (KBr) 1,660 cm.$^{-1}$.

*Analysis.*—Calcd. for $C_{16}H_{14}N_2O$ (percent): C, 76.78; H, 5.64; N, 11.19. Found (percent): C, 76.42; H, 5.79; N, 11.13.

The 2-(2-benzoylphenyl)-2-imidazoline prepared in this manner can form the isomeric 2,3-dihydro-5-phenyl-5H-imidazo[2,1-a]isoindol-5-ol.

The hydrochloride was prepared by adding a solution of hydrogen chloride in methanol to a suspension of 2-(2-benzoylphenyl)-2-imidazoline in methanol. Ether was added and the crystalline precipitate was collected. Recrystallization from a mixture of methanol and ether gave white prisms melting at 173–176° dec. Ultraviolet maximum (2-propanol) at 252 mμ ($\epsilon$=13,600); infrared absorption (KBr) at 1,665 cm.$^{-1}$.

*Anaylsis.*—Calcd. for $C_{16}H_{14}N_2O \cdot HCl$ (percent): Cl, 12.36. Found (percent): Cl, 12.22.

The hydrobromide was prepared by adding an aqueous solution of hydrobromic acid to a suspension of 2-(2-benzoylphenyl)-2-imidazoline in ethanol. Addition of ether gave a precipitate which after recrystallization from a mixture of ethanol and ether gave white platelets melting at 193–194° dec.

*Analysis.*—Calcd. for $C_{16}H_{14}N_2O \cdot HBr$ (percent): Br, 24.13. Found (percent): Br, 24.15.

EXAMPLE 10

Preparation of 2,3-dihydro-5-phenyl-5H-imidazo[2,1-a] isoindole sulfate

To a solution of 0.4 g. (0.0016 mole) of 3′-phenylspiro [imidazolidine-2,1′-phthalan] [or 2-[2′-(α-hydroxybenzyl)phenyl]-2-imidazoline] in 40 ml. of chloroform was added 0.25 ml. of boron fluoride etherate. This solution was refluxed under nitrogen for 6 hours and kept at 25° for 18 hours. After addition of another 0.25 ml. of boron fluoride etherate and refluxing for 3 hours, the solution was washed with aqueous carbonate solution. Concentration of the dried chloroform solution gave a yellow oil which was dissolved in tetrahydrofuran. Acidification with ethanolic sulfuric acid and addition of ethyl acetate gave a crystalline crop which after recrystallization from a mixture of methanol and ethyl acetate gave 0.15 g. (28 percent) of white prisms melting at 216°–223° (dec.). The mixture melting point with authentic I was at 219°–224° (dec.).

EXAMPLE 11

Preparation of 3′-phenylspiro[imidazolidine-2,1′-phthalan] and/or 2-[2′-(α-hydroxybenzyl)-phenyl]-2-imidazoline (A) From 2-(2-benzoylphenyl)-2-imidazoline [or 2,3-dihydro-5-phenyl-5H-imidazo[2,1-a]isoindol-5-ol].—To a solution containing 5 g. of sodium borohydride in 100 ml. of ethanol were added 25 g. of 2-(2-benzoylphenyl)-2-imidazoline [or 2,3-dihydro-5-phenyl-5H-imidazo[2,1-a]isoindol-5-ol] in small portions. The suspension was stirred at 25° for 18 hours and poured into 600 ml. of ice water. Filtration gave 24.5 g. (97 percent) of a crystalline crop melting at 117–119°. A sample was recrystallized from a mixture of methylene chloride, ether and petroleum ether to give white prisms 3′-phenylspiro[imidazolidine-2,1′-phthalan] [or 2-[2′-(α-hydroxybenzyl)phenyl]-2-imidazoline] melting at 119–21°; ultraviolet maxima (2-propanol) 259 mμ ($\epsilon$=2,400) inflexions 284 mμ ($\epsilon$=1,500) NMR ($CDCl_3$) δ 3.47 (s., 4, —$CH_2$—$CH_2$—) δ 5.80 (s., 1, $CH$), δ 6.23 (s., 2, $OH$, $NH$), δ 7.0–7.8 (m., 9, arom CH); ner IR (CHCl) max. 1.49μ ($\epsilon$=0.9) (NH).

*Analysis.*—Calcd. for $C_{16}H_{16}N_2O$ (percent): C, 76.16; H, 6.39; N, 11.10. Found (percent): C, 76.24; H, 6.43; N, 1.29.

(B) From 2-(2-benzoylphenyl)-2-imidazoline [or 2,3-dihydro-5-phenyl-5H-imidazo[2,1-a]isoindol-5-ol] with zinc in ethanol. To a solution of 2.9 g. of the hydrochloride of 2-(2-benzoylphenyl)-2-imidazoline [or 2,3-dihydro-2,3-dihydro-5-phenyl-5H-imidazo[2,1-a]isoindol-5-ol] in 50 ml. of ethanol were added 5 g. of zinc dust. The suspension was stirred and the temperature rose to 34°. After 30 mins. stirring at room temperature the zins was collected on a filter and the filtrate was poured on ice and basified with aqueous sodium hydroxide. The solution was extracted with ether. The extract was washed with water and upon concentration gave white prisms of 3′-phenylspiro[imidazolidine-2,1′-phthalan] [or 2-[2′-(α-hydroxybenzyl)-phenyl]-2-imidazoline]melting at 119–121°.

(C) From 2-(2-benzoylphenyl)-2-imidazoline [or 2,3-dihydro-5-phenyl-5H-imidazo[2,1-a]isoindol-5-ol] by catalytic hydrogenation.—A suspension containing 2.5 g. of 2-(2-benzoylphenyl)-2-imidazoline [or 2,3-dihydro-5-phenyl-5H-imidazo[2,1-a]isoindol-5-ol] and approximately 0.5g. of Raney nickel in 50 ml. of ethanol was shaken in an atmosphere of hydrogen at 25° and one atmosphere of pressure. After 22 hours, the up-take was 240 ml. of hydrogen. The solution was filtered and the filtrate was concentrated in vacuo. The residue was dissolved in ether to give 1.5 g. (60 percent) of white prisms melting at 117–121° of 3′-phenylspiro[imidazolidine-2,1′-phthalan] [or 2-[2′-(α-hydroxybenzyl)-phenyl]-2-imidazoline].

EXAMPLE 12

Preparation of 2,3-dihydro-5-phenyl-5H-imidazo[2,1-a] isoindol-5-ol [or 2-(2-benzoylphenyl)-2-imidazoline]

To a solution of 1.2 g. of 3′-phenylspiro[imidazolidine-2,1′-phthalan] [or 2-[2′-(α-hydroxylbenzyl)-phenyl]-2-imidazoline] in 100 ml. of tetrahydrofuran was added 1.0 g. of a 50 percent suspension of sodium hydride in mineral oil. The mixture was stirred in air at 25° for 18 hours and poured into ice water. A crystalline precipitate was collected which after recrystallization from a mixture of ethanol and petroleum ether gave 0.5 g. of white prisms of 2-(2-benzoylphenyl)-2-imidazoline [or 2,3-dihydro-5-phenyl-5H-imidazo[2,1-a]isoindol-5-ol] melting at 194–196° (dec.).

EXAMPLE 13

Preparation of 2,3-dihydro-5-methyl-5H-imidazo[2,1-a] isoindole sulfate

To a solution of 4 gms. of o-cyano-diphenyl methane in 50 mls. of carbon tetrachloride were added 3.6 gms. of N-bromosuccinimide, and the mixture was refluxed for 6 hours. After cooling, the suspension was filtered, and the filtrate was concentrated to an orange oil which was dissolved in 40 mls. of benzene and 13.5 mls. of ethylene diamine. The solution was refluxed for 2 hours, poured on ice-cold aqueous sodium hydroxide and extracted with benzene. The benzene solution was extracted with 2 N hydrochloric acid and this extract was basified. Extraction with methylene chloride gave an orange oil which was dissolved in ethanol and acidified with sulfuric acid. Dilution with ethyl acetate gave a crystalline precipitate which after recrystallization from a mixture of ethanol in ethyl acetate gave white prisms of 2,3-dihydro-5-methyl-5H-imidazo[a,1-a]isoindole sulfate, melting at 224°–227° [dec.].

What is claimed is:

1. A compound of the formula

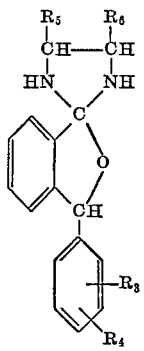

or its tautomer

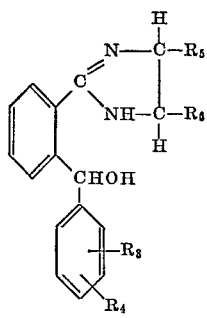

wherein $R_3$ and $R_4$ are each independently selected from the group consisting of hydrogen, halogen, lower alkyl, lower alkoxy, hydroxy and trifluoromethyl and $R_5$ and $R_6$ are each independently selected from the group consisting of hydrogen and lower alkyl of 1–7 carbon atoms or a pharmaceutically acceptable acid addition salt thereof.

2. A compound according to claim 1, wherein $R_5$ and $R_6$ are hydrogen.

3. A compound according to claim 2, wherein $R_3$ is hydrogen.

4. A compound according to claim 3, wherein $R_2$ and $R_4$ are hydrogen, i.e., 3-phenylspiro[imidazolidine-2,1'-phthalan] or its tautomer.

5. A compound of the formula

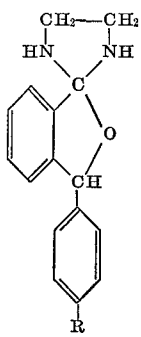

or its tautomer

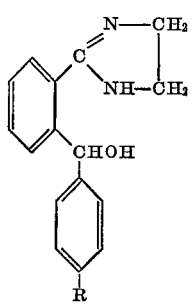

wherein R is hydrogen, halogen or lower alkoxy or the pharmaceutically acceptable acid addition salts thereof.

References Cited

UNITED STATES PATENTS 2,744,910    5/1956    Speeter _____ 260—309.6

FOREIGN PATENTS 213,371    6/1941    Switzerland _____ 260—309.6

OTHER REFERENCES

Inubushi et al., Chem. Abst., vol. 61, col. 9541 (1964).

Loewe et al., German Application 1,241,832, 6/1967 (12P-7/01) (6 page spec.).

Patterson et al., The Ring Index, 2nd ed., p. 310, No. 2401, Wash. D.C., Amer. Chem. Soc., 1960.

NATALIE TROUSOF, Primary Examiner

U.S. Cl. X.R.

260—239 BL, 251 A, 309.7, 465 F, 465 G, 465 R, 591; 424—273